United States Patent
Löffler et al.

(10) Patent No.: US 6,168,546 B1
(45) Date of Patent: Jan. 2, 2001

(54) DEVICE AND METHOD FOR CONTROLLING THE TRANSMITTABLE TORQUE IN A CVT

(75) Inventors: Jürgen Löffler, Winnenden; Martin-Peter Bolz, Oberstenfeld; Joachim Luh, Bietigheim-Bissingen; Holger Hülser, Stuttgart, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/308,171
(22) PCT Filed: Feb. 11, 1998
(86) PCT No.: PCT/DE98/00372
§ 371 Date: May 17, 1999
§ 102(e) Date: May 17, 1999
(87) PCT Pub. No.: WO98/42531
PCT Pub. Date: Oct. 1, 1998

(30) Foreign Application Priority Data

Mar. 26, 1997 (DE) .............................. 197 12 713

(51) Int. Cl.⁷ .................................................. B06K 41/14
(52) U.S. Cl. ............................ 477/109; 477/45; 477/111
(58) Field of Search ..................... 477/107–111, 45–48; 701/51, 54

(56) References Cited

U.S. PATENT DOCUMENTS

| | | |
|---|---|---|
| 4,577,737 | 3/1986 | Niikura et al. . |
| 4,665,773 | 5/1987 | Hiramatsu et al. . |
| 4,720,793 * | 1/1988 | Watanabe et al. ............. 477/107 X |
| 5,042,325 * | 8/1991 | Sawasaki et al. ............... 477/44 X |
| 5,047,937 * | 9/1991 | Vahabzadeh et al. ........... 701/51 X |
| 5,305,213 * | 4/1994 | Boardman et al. .................. 701/51 |
| 5,434,795 | 7/1995 | Mochizuki et al. . |
| 5,738,606 * | 4/1998 | Bellinger ............................ 477/111 |
| 5,931,884 * | 8/1999 | Ochiai ................................. 701/51 |
| 5,948,037 * | 9/1999 | Muraki ............................ 701/54 X |
| 5,989,154 * | 11/1999 | Chrishtensen et al. ........... 477/111 |

FOREIGN PATENT DOCUMENTS

| | | |
|---|---|---|
| 0328166 | 8/1989 | (EP) . |
| 0446497 | 9/1991 | (EP) . |
| 0451887 | 10/1991 | (EP) . |

* cited by examiner

Primary Examiner—Khoi Q. Ta
(74) Attorney, Agent, or Firm—Walter Ottesen

(57) ABSTRACT

The invention proceeds from a control of a transmission, which is continuously adjustable with respect to its transmission ratio, for a motor vehicle wherein the transmission together with a drive unit is mounted in the drive train of the motor vehicle. The drive unit has an adjustable output torque. According to the invention, determination means for determining a quantity is provided which represents the instantaneous maximum transmittable torque of the transmission. Furthermore, the output torque of the drive unit is limited to a limit value by limiting means. This limit value is determined in dependence upon the above-determined quantity. In order to reliably protect the transmission against damage by increased slippage, it is therefore provided according to the invention to limit the torque outputted by the engine when the contact force is so small that the danger of slippage exists. The torque of the motor can, in general, be more rapidly limited than the contact force can be increased. For this reason, one obtains a reliable system without having to provide a safety reserve for the contact force which is too great with respect to the required consumption of fuel.

10 Claims, 2 Drawing Sheets

DEVICE AND METHOD FOR CONTROLLING THE TRANSMITTABLE TORQUE IN A CVT

FIELD OF THE INVENTION

Figure 1:
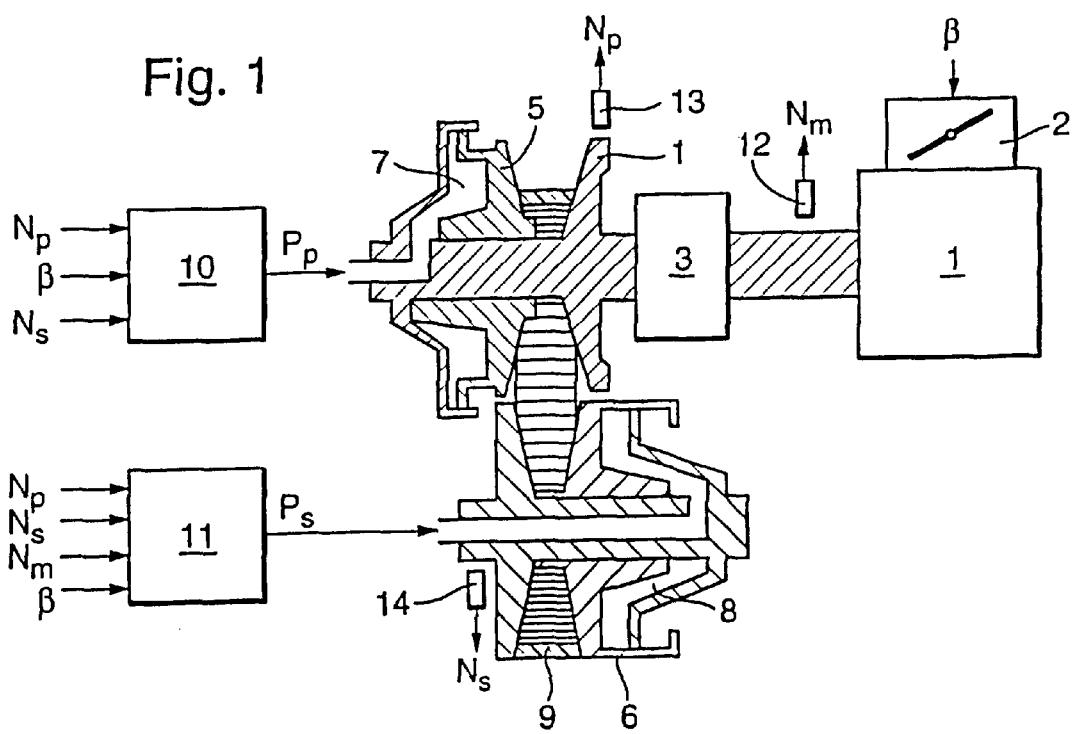

The invention relates to an arrangement and a method for controlling a transmission in a motor vehicle. The transmission is adjustable continuously with respect to its transmission ratio.

BACKGROUND OF THE INVENTION

In motor vehicles having a continuously adjustable transmission (CVT) having a continuous element (for example, a belt-like member or chain), the pressing force of the belt-like member must be so adjusted by suitable measures that the torque which is to be transmitted, can be reliably transmitted. If the pressing force is too low, then a high slippage between the driving element and the conical pulleys occurs which can lead to damage. If the contact pressure is too high, then the efficiency of the transmission is too low which leads to an unnecessarily high consumption of fuel. For this reason, it is advantageous to so select the contact force that the torque, which can maximally be transmitted at this contact force, is somewhat greater than the actual torque which is to be transmitted.

For CVT controls, as they are known, for example, from European patent publication 0,451,887, the transmission input torque is determined from the torque outputted by the engine and the amplification by a possibly present hydrodynamic converter. From this torque, a belt tension is computed from which a contact force results which makes possible a reliable transmission of this torque. The contact force cannot be increased rapidly enough for rapid changes of the torque to be transmitted because of the inertia of the mechanical/hydraulic system. For this reason, a considerable safety reserve is considered as a rule which causes an increased consumption of fuel.

SUMMARY OF THE INVENTION

The object of the present invention is to provide effective measures to counter the occurrence of excessive slippage in order to reliably avoid damage to the transmission.

As mentioned, the invention proceeds from a control of a transmission, which is continuously adjusted as to its transmission ratio, for a motor vehicle. The transmission together with a drive unit is arranged in the drive train of the motor vehicle and the drive unit has an adjustable output torque. According to the invention, determination means are provided for determining a quantity which represents the instantaneous maximum transmittable torque. Furthermore, the output torque of the drive unit is limited to a boundary value by limiting means. This boundary value is determined in dependence upon the above-determined quantity.

In order to reliably protect the transmission against damage by increased slippage, it is therefore provided according to the invention to limit the torque outputted by the motor when the contact force is so low that the danger of excessive slippage exists. The torque of the engine can, in general, be more rapidly limited than the contact force can be increased. For this reason, one arrives at a reliable system without it being necessary to provide, for the contact force, too great a safety reserve which demands a higher consumption of fuel. With the invention, one therefore arrives at an increase of the efficiency of the transmission by the reduction of the contact force compared to existing systems without a safety loss and therefore to a reduction of the consumption of fuel. In this way, one arrives at an increased reliability of torque transmission by the transmission because slippage is reliably avoided which also leads to an increase of driving safety. In addition, the service life of the transmission is increased by the reliable avoidance of slippage.

In an advantageous configuration of the invention, a converter is provided in the drive train which exhibits a determinable torque amplification. In this case, the determination of the boundary value is made in dependence upon the actual converter amplification.

If a clutch is provided in the drive train, which exhibits a determinable torque transmission, then the determination of the boundary value is advantageously made in dependence upon the actual torque transmission.

As already mentioned, the drive belt transmission, in general, has a drive end as well as an output end and effective means (drive belt, for example, belt-like member or chain) for producing a mechanically effective connection between the drive end and the output end. In an advantageous embodiment of the invention, detecting means are provided which detect a contact quantity representing the contact force between the effective means and the drive and/or output ends. For this purpose, the hydraulic contact pressure can be measured directly or can be determined from corresponding control signals. The determination means of the invention are so configured that that quantity is determined from the detected contact force, which represents the instantaneous maximum transmittable torque of the transmission.

Furthermore, it can be provided that the limiting means are so configured that the output torque of the drive unit can be limited as to positive limit values (drive torque limiting) as well as to negative limit values (drag torque limiting). This means that the magnitude of the output torque of the drive unit is compared to the determined limit value and the output torque of the drive unit is reduced (drive torque limiting) or increased (drag torque limiting) in reaction to the limit value being exceeded.

BRIEF DESCRIPTION OF THE INVENTION

Figure 2:
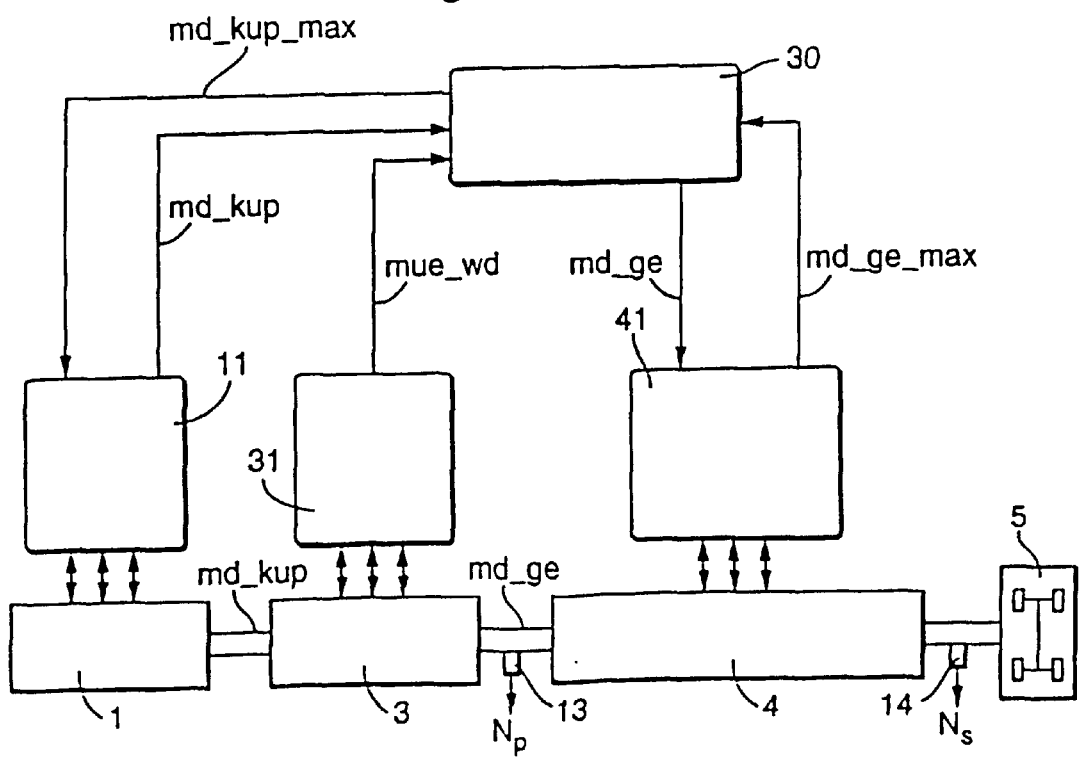

FIG. 1 schematically shows a CVT having a known control of the contact force; whereas, FIG. 2 shows the embodiment with respect to a block circuit diagram.

Figure 3:
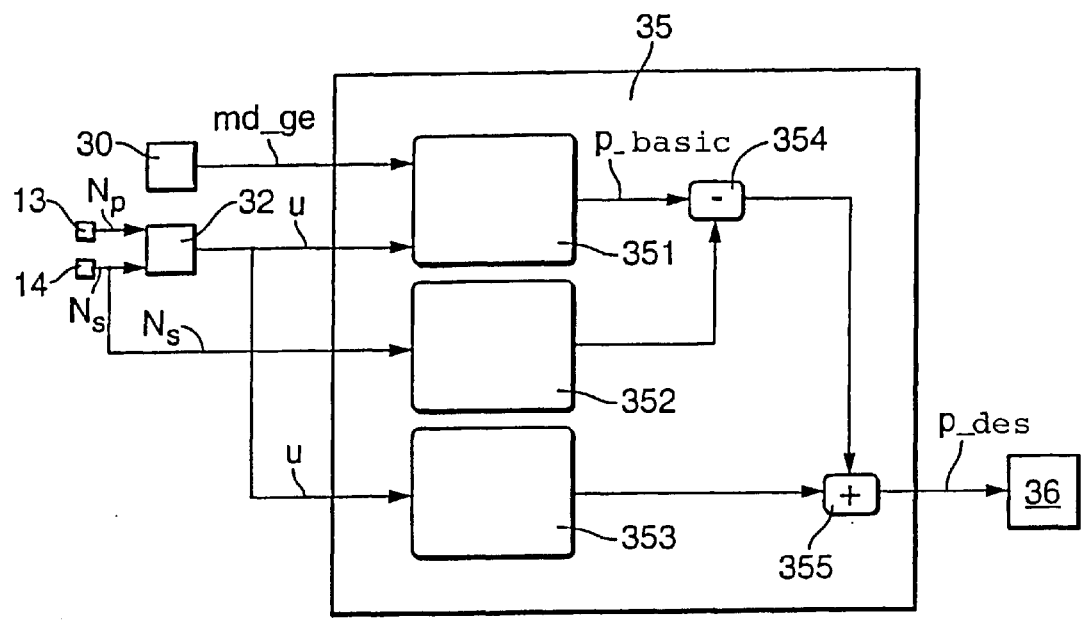
Figure 4:
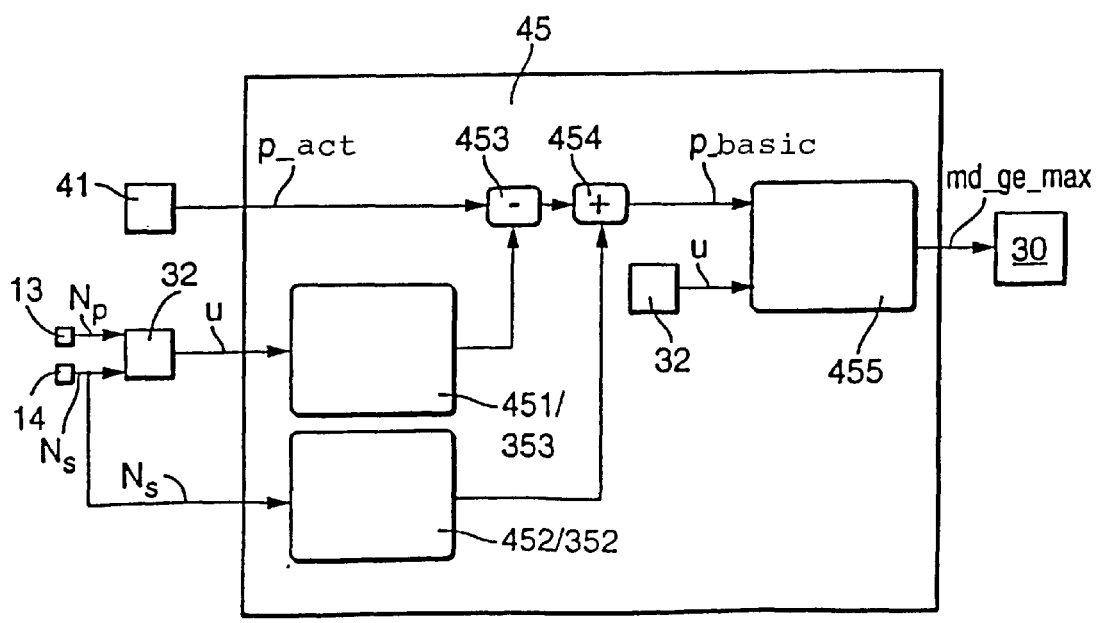

FIGS. 3 and 4 contain details of the block circuit diagram shown in FIG. 2.

DESCRIPTION OF THE PREFERRED EMBODIMENTS OF THE INVENTION

The invention will now be described in detail with respect to the embodiments.

In FIG. 1, a known assembly of a CVT transmission is shown in section. The internal combustion engine 1 can be influenced via the throttle flap 2 as to its outputted torque $M_m$. The throttle flap 2 is, for example, coupled mechanically or electrically to the accelerator pedal (not shown). The internal combustion engine 1 is mostly coupled via a clutch and/or a converter 3 to the drive (primary) end of the CVT transmission 4. The output (secondary) end of the CVT transmission 4 is connected via a downstream gear assembly (not shown) to the wheels of the vehicle. The CVT transmission has axially displaceable conical discs 5 and 6 on the primary and secondary ends, respectively. A corresponding primary pressure $P_p$ and secondary pressure $P_s$ is built up in the oil chambers 7 and 8, respectively, for adjusting the transmission ratio. The following must be ensured by a suitable selection of the actuating variables of primary pressure $P_p$ and secondary pressure $P_s$:

1. that the transmission ratio i corresponds to the desired ratio of primary rpm $N_p$ and secondary rpm $N_s$; and,
2. that the force-transmitting thrust element belt 9 (that is, a chain, band) is pressed against the discs with adequate intensity in order to prevent a slippage of the thrust member belt 9.

The above-mentioned point 1 is realized by an electro-hydraulic transmission or primary rpm control 10. A belt tension control 11 is utilized for point 2.

Rpm sensors 12, 13 and 14 are present on the engine 1 and the CVT transmission 4 for the control of the transmission ratio and the belt tension. The rpm sensors 12, 13 and 14 detect the engine rpm $M_m$, the primary rpm $N_p$ and the secondary rpm $N_s$.

In the master-slave principle shown in FIG. 1 and often utilized, the secondary pressure $P_s$ serves to adjust the belt tension and the primary pressure $P_p$ serves to adjust the transmission rpm or primary rpm. In the alternatively possible partner principle, the belt tension control influences the primary pressure as well as the secondary pressure.

In general, one can state that for the belt tension control, an actuating signal in the form of a pressure quantity $P_B$ is available. Several methods for controlling the belt tension are known from the literature which all, however, operate in a similar way.

FIG. 2 shows a motor with reference numeral 1 which is connected via a converter 3 and a CVT 4 to the vehicle drive wheels 5. The output torque md_kup of the engine can be controlled (open loop or closed loop) by means of an engine control or by means of an engine torque coordination 11. The torque amplification mue_wd of the converter 3 is computed in block 31, in general from the converter slippage (from the ratio engine rpm/primary rpm $N_p$) via a characteristic field. The mentioned contact force is determined in block 41. First, the actual maximum transmittable torque md_ge_max of the transmission is computed in block 41 from the actual operating point of the belt element.

This can, for example, take place simply via an inversion of the method described in the initially mentioned European patent publication 0,451,887, wherein the needed contact force is determined from the actual transmission input torque.

If the engine 1 of the vehicle has the possibility to electronically influence the outputted torque md_kup (for example by an ignition angle intervention or an electronic engine power control such as E-gas or EDC), then, in the engine control 11, the magnitude of the torque required by the engine can be limited to the maximum transmittable torque md_ge_max from the transmission while considering the torque amplification mue_wd of the hydrodynamic converter 3.

A reduction of the engine output torque md_kup can, for example, take place as is known from the known output slippage control system (ASR). An increase of the engine output torque md_kup in the case of too high a drag torque (for example, in overrun operation of the engine), can take place, for example, as it is known in known engine drag torque control systems (MSR).

First, the transmission input torque md_ge is computed from the engine output torque md_kup and the converter amplification mue_dw in the torque coordinator 30 (FIG. 2) for the drive train:

$$md\_ge = md\_kup * mue\_wd$$

A computation block 35 in the control 41 of the transmission determines a contact force p_des according to a method as shown in FIG. 3. For this purpose, the transmission input md_ge, which is determined in block 30, and the actual transmission ratio $\mu$ (determined in dependence upon the signals of the rpm sensors 13 and 14 in block 32) are supplied to the characteristic field 351 to determine the basic contact pressure p_basic. A value, which is dependent upon the transmission output rpm Ns (characteristic line centrifugal force correction 352), is subtracted from this basic pressure in the unit 354. In the unit 355, a certain safety supplement (characteristic line reserve pressure 353) is added thereto in dependence upon the transmission ratio. In this way, one obtains the desired contact pressure p_des which is to be adjusted.

If, as shown in FIG. 4, the actual contact pressure p_act is measured by a sensor 41, then the maximum transmission input torque md_ge_max to be transmitted can be computed quasi via an inversion of the desired contact pressure determination described in FIG. 3. For this purpose, the above-described corrective value (characteristic line centrifugal force correction 352) and the safety supplement (characteristic line reserve pressure 353) is added or subtracted. The maximum transmission input torque md_ge_max, which is to be transmitted, is determined from the basic contact pressure p_basic which is so determined in dependence upon the instantaneous transmission ratio $\mu$ by means of characteristic field 455.

In block 30, the maximum transmission input torque md_ge_max which is to be transmitted, is divided by the actual torque amplification mue_wd of the converter. From this, the maximum engine output torque md_kup_max is obtained. The torque coordinator motor 11 has now the task to limit the engine output torque to this value md_kup_max.

As a rule, a torque intervention on the engine can take place considerably faster than the increase of the contact pressure of the belt element. For this reason, in this case, the safety reserve for protecting against rapid dynamic changes of the transmission input torque can be selected smaller which causes a reduced consumption of fuel.

What is claimed is:

1. An arrangement for controlling a continuously variable transmission in a motor vehicle wherein the transmission together with a drive unit is arranged in the drive train of the motor vehicle and the motor vehicle being operable in drive operation wherein the drive unit drives the wheels of the vehicle via the transmission to provide a positive output torque of said drive unit transmitted in a first direction and in overrun operation wherein the wheels drive the drive unit via the transmission to cause a negative output torque transmitted in a second direction opposite to said first direction, the drive unit having an adjustable output torque (md_kup), the arrangement comprising:

determination means for determining a specific quantity (md_ge_max) which represents the instantaneous maximum torque transmittable by said transmission and which is independent of said direction of transmission of the torque;

control means for determining a limit value (md_kup_max) in dependence upon said specific quantity (md_ge_max); and, limiting means for limiting said output torque (md_kup) of said drive unit to said limit value (md_kup_max) as follows:

(a) in drive operation, decreasing said output torque (md_kup) of said drive unit when said output torque crosses over said limit value (md_ku_max); and, (b) in overrun operation, increasing said output torque (md_kup) of said drive unit when said negative output torque crosses over said limit value (md_kup_max);

whereby the maximum torque transmittable by said transmission is not exceeded and damage thereto is avoided.

2. The arrangement of claim 1, further comprising: a converter mounted in said drive train and having a determinable actual torque converter amplification (mue_wd) and said control means including means for determining said limit value (md_kup_max) in dependence upon the actual converter amplification (mue_wd).

3. The arrangement of claim 1, further comprising a clutch mounted in said drive train and having a determinable torque transmission; and, said control means including means for determining said limit value (md_kup_max) in dependence upon the actual torque transmission.

4. The arrangement of claim 1, said transmission including a drive end, an output end and effective means for establishing a mechanically operative connection between the drive end and the output end; and, detecting means for detecting a contact quantity (p_des, p_act) representing the contact pressure between said effective means and at least one of said drive end and said output end; and, said determination means being so configured that the quantity (md_ge_max) is determined from the detected contact quantity (p_des, p_act); and, said quantity (md_ge_max) representing the instantaneous maximum transmittable torque of said transmission.

5. The arrangement of claim 1, said limiting means being so configured that the absolute magnitude of said output torque (md_kup) of said drive unit is compared to said limit value (md_kup_max); and that, in response to said limit value (md_kup_max) being crossed over, said output torque (md_kup) of said drive unit is reduced in the drive operation (drive torque limiting) to bring said output torque (md_kup) below said limit value (md_kup_max) or, in the overrun operation, said output torque is increased (drag torque limiting).

6. A method for controlling a continuously variable transmission in a motor vehicle, wherein the transmission together with a drive unit is mounted in the drive train of the motor vehicle and the motor vehicle being operable in drive operation wherein the drive unit drives the wheels of the vehicle via the transmission to provide a positive output torque of said drive unit transmitted in a first direction and in overrun operation wherein the wheels drive the drive unit via the transmission to cause a negative output torque transmitted in a second direction opposite to said first direction, the drive unit having an adjustable output torque (md_kup), the method comprising the steps of:

determining a specific quantity (md_ge_max) which represents the instantaneous maximum torque transmittable by the transmission and which is independent of said direction of transmission of the torque;

determining a limit value (md_kup_max) in dependence upon said specific quantity (md_ge_max);

limiting the output torque (md_kup) of the drive unit to said limit value (md_kup_max) so that the magnitude of said output torque (md_kup) of said drive unit is compared to said limit value (md_kup_max); and, in response to said limit value being crossed over, adjusting said output torque (md_kup) as follows:

(a) in drive operation, decreasing said output torque (md_kup) of said drive unit when said output torque crosses over said limit value (md_kup_max); and, (b) in overrun operation, increasing said output torque (md_kup) of said drive unit when said negative output torque crosses over said limit value (md_kup_max);

whereby the maximum torque transmittable by said transmission is not exceeded and damage thereto is avoided.

7. The method of claim 6, wherein a converter is provided in the drive train having a torque amplification (mue_wd) which is determined; and, wherein the method comprises the further step of: determining said limit value (md_kup_max) in dependence upon actual converter amplification (mue_wd).

8. The method of claim 6, wherein a clutch is provided in the drive train having a torque transmission which is determined; and, wherein the method comprises the further step of determining the limit value (md_kup_max) in dependence upon actual torque transmission.

9. The method of claim 6, wherein said transmission has a drive end, an output end and effective means for producing a mechanical operative connection between the drive end and the output end; and, wherein the method comprises the further steps of:

detecting a contact quantity (p_des, p_act), the contact quantity representing the contact pressure between the effective means and the drive end and/or the output end; and, determining said specific quantity (md_ge_max) from said detected contact quantity (p_des, p_act), the quantity (md_ge_max) representing the instantaneous maximum transmittable torque of the transmission.

10. The method of claim 6, comprising the further steps of:

comparing the absolute magnitude of the output torque (md_kup) of the drive unit to the determined limit value (md_kup_max); and, in response to crossing over the limit value in the drive direction, reducing the output torque (md_kup) of the drive unit (drive torque limiting) to bring said output torque (md_kup) below said limit value (md_kup_max) or, in the overrun operation, increasing (drag torque limiting) said output torque (md_kup).

* * * * *